(12) United States Patent
Innes

(10) Patent No.: US 11,225,020 B2
(45) Date of Patent: Jan. 18, 2022

(54) THREE-DIMENSIONAL PRINTING SYSTEM WITH SLOPED BUILD PLANE

(71) Applicant: 3D Systems, Inc., Rock Hill, SC (US)

(72) Inventor: Eric M. Innes, San Diego, CA (US)

(73) Assignee: 3D Systems, Inc., Rock Hill, SC (US)

( * ) Notice: Subject to any disclaimer, the term of this patent is extended or adjusted under 35 U.S.C. 154(b) by 186 days.

(21) Appl. No.: 16/773,342

(22) Filed: Jan. 27, 2020

(65) Prior Publication Data

US 2020/0254685 A1 Aug. 13, 2020

Related U.S. Application Data

(60) Provisional application No. 62/802,736, filed on Feb. 8, 2019.

(51) Int. Cl.
| | |
|---|---|
| *B29C 64/245* | (2017.01) |
| *B33Y 10/00* | (2015.01) |
| *B33Y 50/02* | (2015.01) |
| *B29C 64/129* | (2017.01) |
| *B29C 64/393* | (2017.01) |
| *B33Y 30/00* | (2015.01) |
| *B29C 64/135* | (2017.01) |

(Continued)

(52) U.S. Cl.
CPC .......... *B29C 64/245* (2017.08); *B29C 64/129* (2017.08); *B29C 64/393* (2017.08); *B33Y 10/00* (2014.12); *B33Y 30/00* (2014.12); *B33Y 50/02* (2014.12); *B29C 64/106* (2017.08); *B29C 64/124* (2017.08); *B29C 64/135* (2017.08); *B29C 64/255* (2017.08); *B29C 64/268* (2017.08); *B29C 64/307* (2017.08); *B29C 64/321* (2017.08); *B29C 64/343* (2017.08); *B29C 64/357* (2017.08)

(58) Field of Classification Search
CPC ... B29C 64/106; B29C 64/124; B29C 64/129; B29C 64/135; B29C 64/245; B29C 64/255; B29C 64/268; B29C 64/307; B29C 64/321; B29C 64/343; B29C 64/357; B29C 64/393; B33Y 10/00; B33Y 30/00; B33Y 50/02
USPC ........................................................ 264/40.1
See application file for complete search history.

(56) References Cited

U.S. PATENT DOCUMENTS

| | | | | |
|---|---|---|---|---|
| 5,192,559 | A | * | 3/1993 | Hull ...................... B29C 64/188 425/89 |
| 2018/0222125 | A1 | * | 8/2018 | Wynne .................. B33Y 30/00 |

(Continued)

*Primary Examiner* — Joseph S Del Sole
*Assistant Examiner* — Lawrence D. Hohenbrink, Jr.

(57) ABSTRACT

A three-dimensional printing system for manufacturing a three-dimensional article includes a transparent substrate, a fluid handling system, a support tray, and a light engine. The transparent substrate slopes downwardly from an upper end toward a lower end. The fluid handling system is configured to input photocurable resin at the upper end and to receive the photocurable resin at the lower end. The fluid handling system thereby forms a gravity-driven flowing sheet of resin over an upper surface of the transparent sheet. The support tray is mounted to a movement mechanism. The support tray has a lower face for supporting the three-dimensional article. The lower face is generally parallel to the upper surface of the transparent substrate. The light engine is positioned below the transparent substrate for selectively illuminating the resin along a build plane that is within the resin and parallel to the upper surface of the transparent substrate.

15 Claims, 4 Drawing Sheets

(51) Int. Cl.
*B29C 64/343* (2017.01)
*B29C 64/255* (2017.01)
*B29C 64/321* (2017.01)
*B29C 64/124* (2017.01)
*B29C 64/106* (2017.01)
*B29C 64/357* (2017.01)
*B29C 64/268* (2017.01)
*B29C 64/307* (2017.01)

(56) References Cited

U.S. PATENT DOCUMENTS

2019/0381732 A1* 12/2019 Chen ............... B29C 64/188
2020/0391438 A1* 12/2020 Costabeber ............ B29C 64/25

* cited by examiner

THREE-DIMENSIONAL PRINTING SYSTEM WITH SLOPED BUILD PLANE

CROSS-REFERENCE TO RELATED APPLICATIONS

This non-provisional patent application claims priority to U.S. Provisional Application Ser. No. 62/802,736, Entitled "THREE-DIMENSIONAL PRINTING SYSTEM WITH SLOPED BUILD PLANE" by Eric M. Innes, filed on Feb. 8, 2019, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present disclosure enables a printing system to reduce a hydraulic force between the lower face of a three-dimensional article and a transparent substrate and can also reduce system maintenance.

BACKGROUND

Three dimensional (3D) printers for manufacturing three-dimensional articles are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support tray, and a controllable light engine. For some of these systems, a resin vessel includes a transparent substrate that is supported above the light engine. The light engine defines a build plane within the resin above the transparent substrate. The movement mechanism positions a lower face of the support tray or three-dimensional article within the resin at the build plane. The light engine then selectively cures the photocurable resin at the build plane and upon the lower face. One challenge with such a system concerns a hydraulic force between the lower face and the transparent substrate. Another challenge is a possible build-up of cured resin upon the build plate.

SUMMARY

Figure 1A:
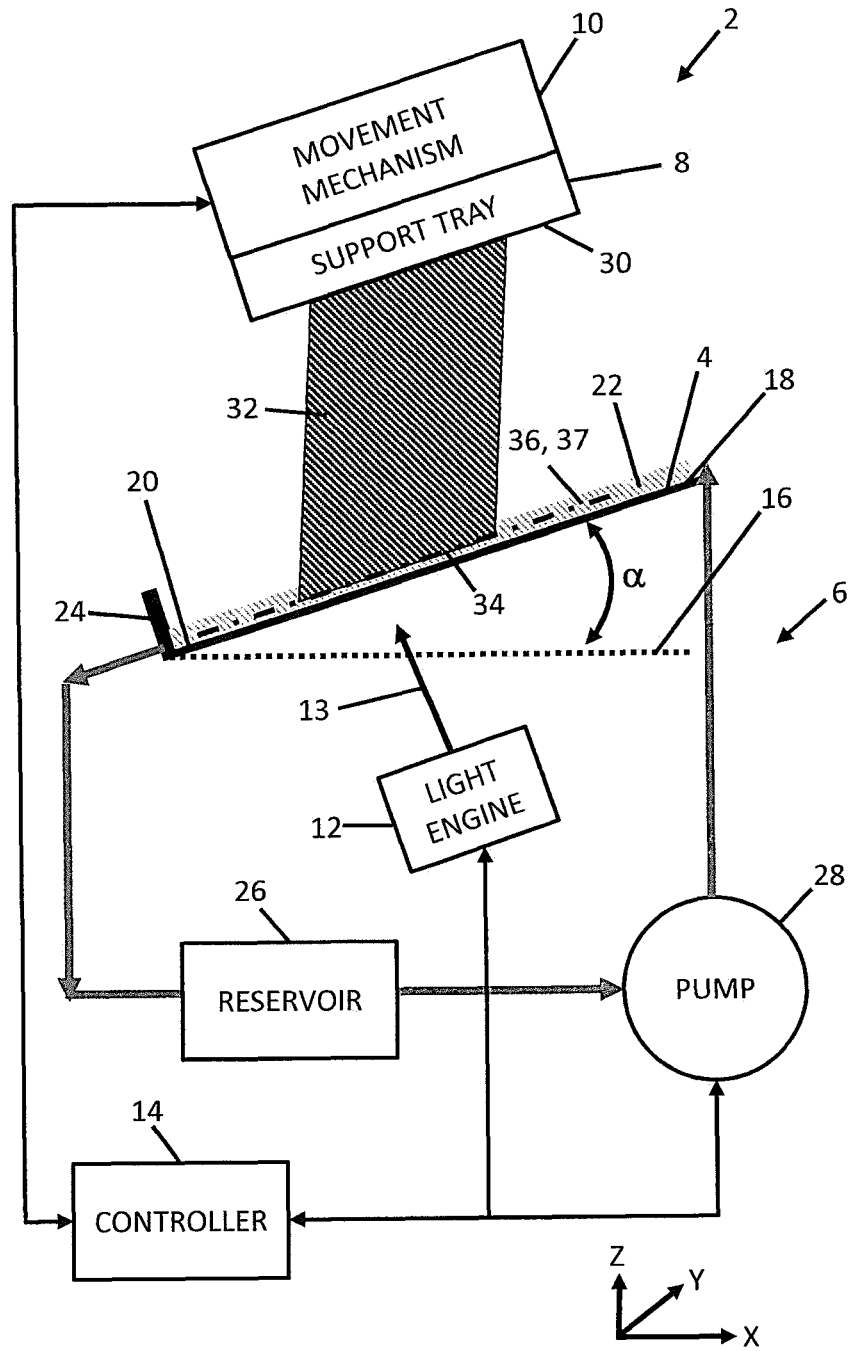
FIG. 1A is a schematic diagram depicting a first embodiment of a three-dimensional printing system.

According to a first aspect of the disclosure, a three-dimensional printing system for manufacturing a three-dimensional article includes a transparent substrate, a fluid handling system, a support tray, and a light engine. The transparent substrate slopes downwardly from an upper end toward a lower end. The fluid handling system is configured to input photocurable resin at the upper end and to receive the photocurable resin at the lower end. The fluid handling system thereby forms a gravity-driven flowing sheet of resin over an upper surface of the transparent sheet. The support tray is mounted to a movement mechanism. The support tray has a lower face for supporting the three-dimensional article. The lower face is generally parallel to the upper surface of the transparent substrate. The light engine is positioned below the transparent substrate for selectively illuminating the resin along a build plane that is within the resin and parallel to the upper surface of the transparent substrate.

In one implementation, the slope of the transparent substrate defines an angle with respect to a horizontal plane. The angle is within a range of 5 to 40 degrees. More particularly, the angle is within a range of 10 to 30 degrees.

In another implementation, the upper surface of the transparent substrate has a variable topology on a small scale. By variable topology on a small scale it is meant that the overall geometry is planar, but that the topology is variable on a scale of one millimeter or smaller. The variable topology can be in the form or surface roughness, channels, or other features. The variable topology can be provided by one or more of mechanical roughening (e.g., blasting with small beads), etching, micro-embossing, injection molding, and other methods of providing a variable topology.

In yet another implementation, the transparent substrate is a rigid transparent plate formed from one or more of glass, porous glass, sapphire, quartz, polymer, and multilayer laminates. The glass can be optical grade. The polymer can be optical grade, such as cyclic olefin polymer (COP). The rigid plate can be at least about 1 millimeter or at least about 2 millimeters, or at least about 3 millimeters or more in thickness. The thickness is intended to provide a rigid plate that can withstand the bending and shear forces applied during use. In some implementations the plate can be non-planar and can provide a light-guiding property.

In a further implementation, the transparent substrate is formed from a flexible or bendable material which can be a clear polymer. The flexible transparent substrate can be one or more of a polymer sheeting, a molded polymer, a 3D printed polymer, an extruded polymer, or another flexible or bendable material.

In a yet further implementation, the system can include a vibration unit that is mechanically coupled to the transparent substrate. The vibration unit imparts vibrations that are at least along a plane defined by the upper surface of the transparent substrate. The vibration unit can include one more of an ultrasonic transducer and a motorized eccentric weight.

In another implementation, the light engine is a projection unit. The projection unit can define an optical axis that defines an oblique angle with respect to a vertical axis. The oblique angle can be in a range of 5 and 40 degrees or more particularly between 10 and 30 degrees. The oblique angle enables gravity driven flow of resin across the upper surface of the transparent substrate and may be selected based upon a rheology of the resin.

In yet another implementation, the light engine includes an array of light emitting devices. The array of light emitting devices can form light beams that are scanned across the build plane. The light emitting devices can include one or more of light emitting diodes, diode lasers, and vertical cavity surface lasers (VCSEL's).

In a further implementation, the light engine defines a build plane within the flowing sheet of resin that is generally parallel to the upper surface of the transparent substrate. The three-dimensional printing system further includes a controller that is coupled to the fluid handling system, the movement mechanism, the light engine, and other portions of the system. The controller includes a processor coupled to an information storage device. The information storage device includes a non-volatile or non-transient device storing software instructions. When executed by the processor, the software instructions operate the system portions. In this way, the controller is configured to operate the fluid handling system to provide the flow of the resin over the upper surface of the transparent substrate, operate the movement mechanism to position a lower face of the support tray or three-dimensional article at the build plane, operate the light engine to selectively harden a layer of resin upon the lower face, and repeat operation of the movement mechanism and the light engine to complete formation of the three-dimensional article in a layer-by-layer manner.

According to a second aspect of the disclosure, a method of manufacturing a three-dimensional article includes operation of a fluid handling system, movement mechanism, and a light engine. The fluid handling system operation provides a gravity-driven flow of a sheet of resin along a sloping upper surface of a transparent substrate. The movement mechanism operation positions a lower face of a support tray or three-dimensional article at a build plane within the flowing sheet of resin. The light engine operation selectively illuminates the build plane to selectively harden a layer of photocurable resin onto the lower face. The movement mechanism and light engine operation are repeated to complete fabrication of the three-dimensional article.

DETAILED DESCRIPTION OF THE PREFERRED EMBODIMENTS

FIG. 1A is a schematic diagram depicting a first embodiment of a three-dimensional printing system 2 including a transparent substrate 4, a fluid handling system 6, a support tray 8 coupled to a movement mechanism 10, a light engine 12, and a controller 14. In describing system 2, axes X, Y, and Z can be used. Axes X and Y are generally horizontal and axis Z is generally vertical and generally aligned with a gravitational reference. As discussed herein, the term "generally" refers to having a dimension, an angle, or other parameter that is within manufacturing or placement tolerances. For example, "generally equal" means that a design goal is equality but may vary according to manufacturing tolerances and other factors such as a placement location.

Figure 2:
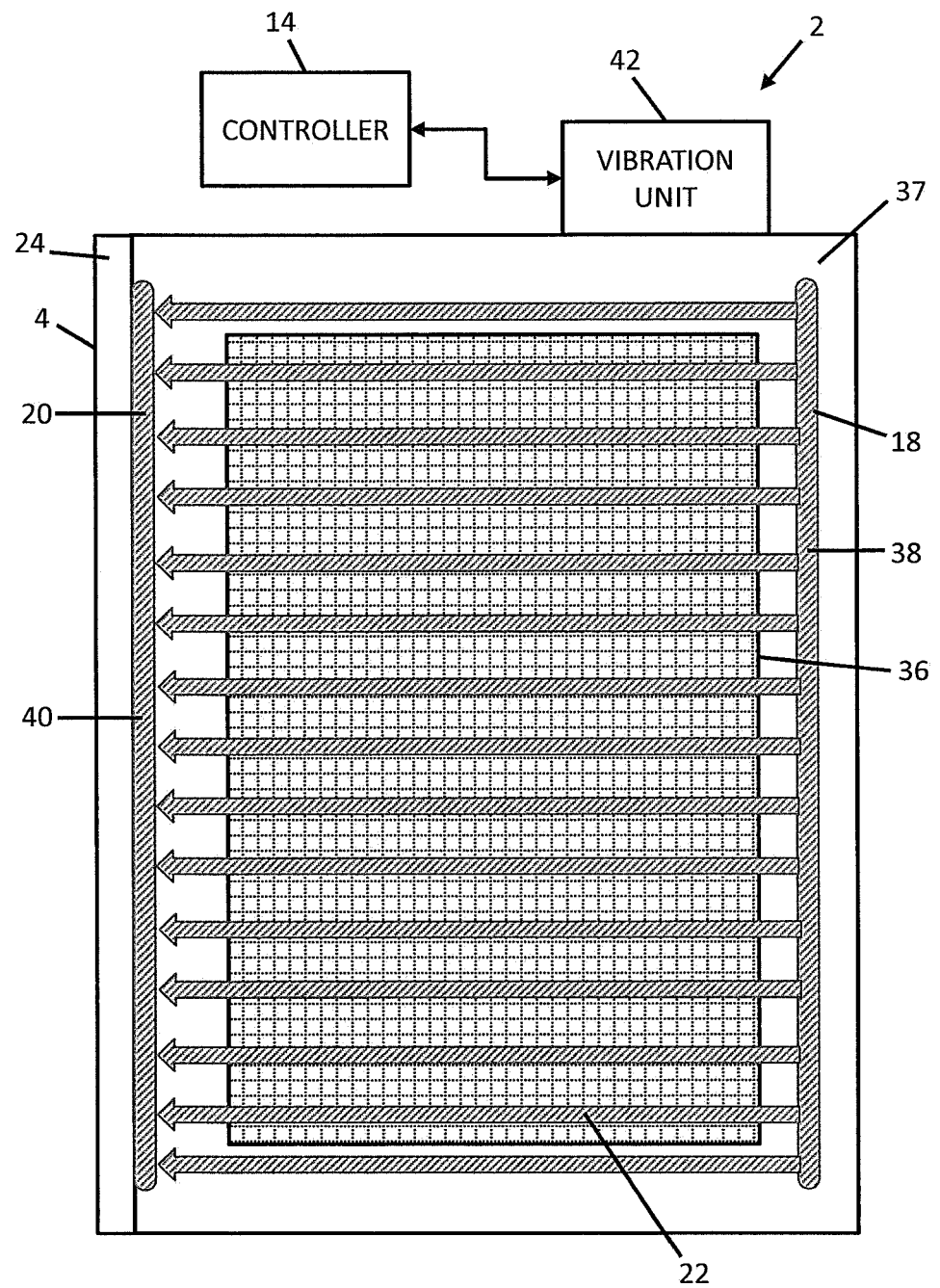
FIG. 2 is a schematic diagram depicting portions of an embodiment of a three-dimensional printing system including a top view of a transparent substrate.
Figure 3:
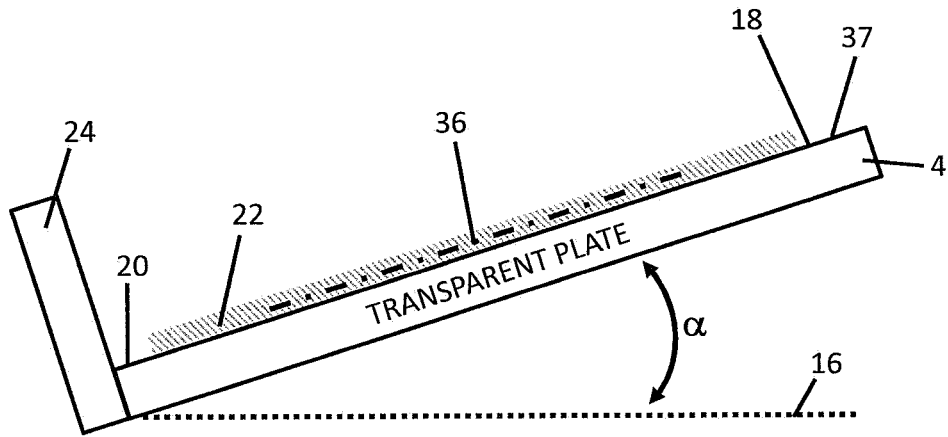
FIG. 3 is a schematic side view of an embodiment of a transparent substrate.

The transparent substrate 4 is further schematically illustrated in FIG. 2 (top view) and FIG. 3 (cross-sectional view). The transparent substrate 4 defines an angle alpha ($\alpha$) with respect to a horizontal axis 16 and slopes downwardly from an upper end 18 to a lower end 20.

A fluid handling system 6 introduces a flowing sheet of photocurable resin 22 at the upper end 18 and receives the resin 22 at the lower end 20. The sheet of resin 22 thus flows from the upper end 18 to the lower end 20 under a flow direction component of gravitational force. Thus, the movement of the sheet of resin 22 is gravity driven. In the illustrated embodiment, a force driving the flow along the transparent substrate is proportional to a gravitational constant g and to a sine of the angle $\alpha$ or proportional to $g*\sin(\alpha)$.

A dam 24 facilitates capture of the resin 22 at the lower end 20. In the illustrated embodiment, the fluid handling system 6 recirculates the resin 22 from the lower end 20 to the upper end 18. The illustrated system 6 includes a reservoir 26 and a pump 28.

The support tray 8 includes a lower face 30 for supporting a three-dimensional article 32. The three-dimensional article 32 has a lower face 34 that is positioned at a build plane 36. The movement mechanism 10 is configured to vertically position the support tray 8 to properly position lower face 30 or 34 at the build plane 36. In the illustrated embodiment the movement mechanism 10 is configured to provide precision motion and positioning of the support tray 8 along the vertical Z-axis.

The light engine 12 is configured to selectively provide radiation to the build plane 36 for curing and hardening layers of resin onto lower face 30 or 34. The build plane 36 defines a maximum area or extent over which the light engine 12 can operate. The light engine 12 includes optics that define an optical axis 13 that is generally perpendicular to the build plane 36. The optical axis 13 is oblique relative to the vertical axis Z and generally defines an oblique angle $\alpha$ with respect to Z. A lateral extent 37 of the light engine 12 is defined along the build plane 36 and defines an addressable area of the light engine 12 which is the lateral extent over which the light engine 12 can harden the resin 22.

The controller 14 is controllably coupled for operating the fluid handling system 6, the movement mechanism 10, the light engine 12, and other portions of the system 1. Controller 14 includes a processor coupled to an information storage device. The information storage device includes a non-volatile or non-transient portion storing software instructions. When executed by the processor, the software instructions operate controllable portions of system 2. Controller 2 can be a single integrated controller or it can includes multiple devices that can be co-located with and/or remote from illustrated portions of system 2.

Figure 1B:
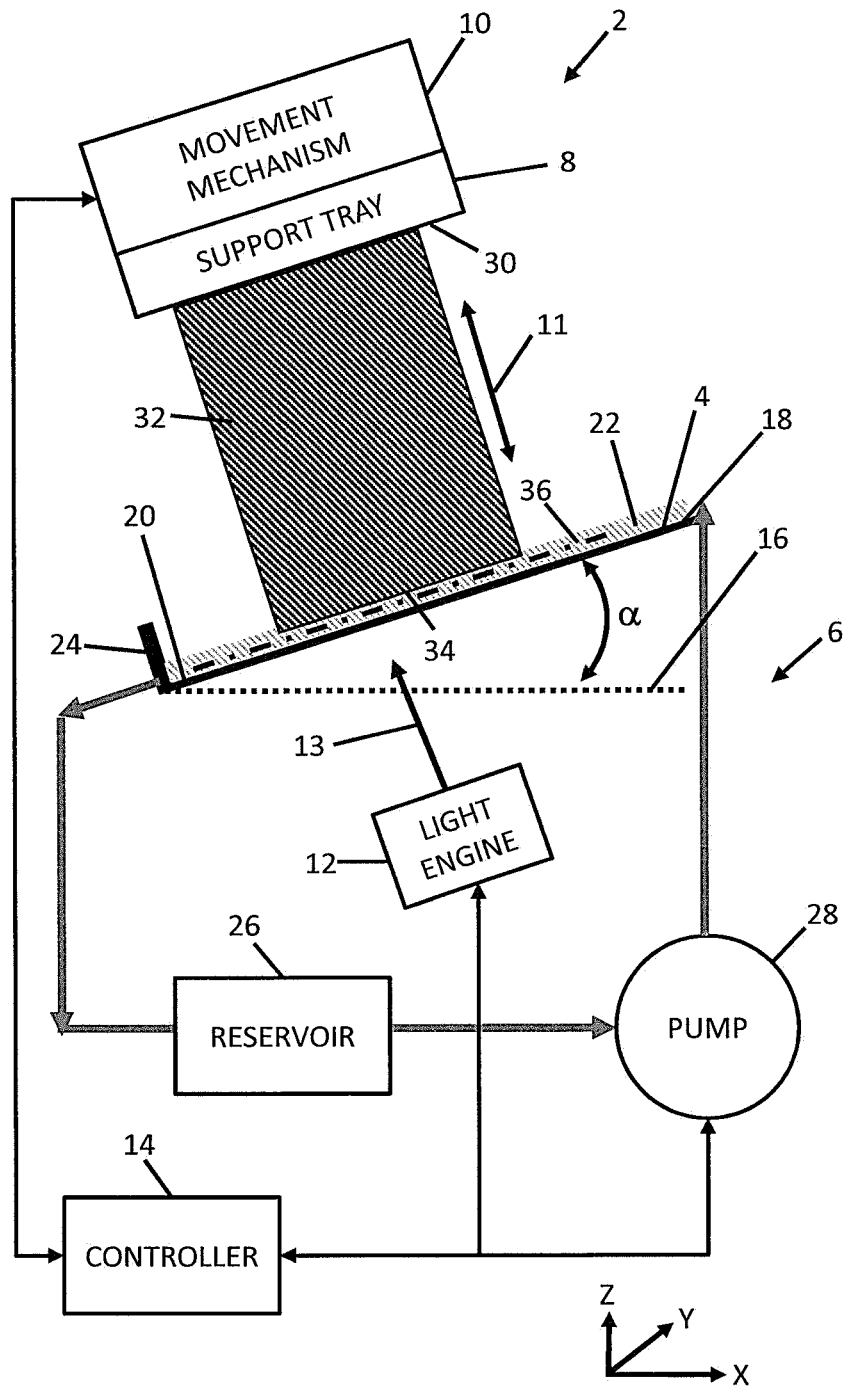
FIG. 1B is a schematic diagram depicting a second embodiment of a three-dimensional printing system.

FIG. 1B is a schematic diagram depicting a second embodiment of a three-dimensional printing system 2. FIG. 1B is similar to the embodiment of FIG. 1A except that the movement mechanism 10 is configured to provide motion and positioning of the support tray 8 along an axis 11 that is perpendicular to build plane 36. Axis 11 can be generally parallel to the optical axis 13 of the light engine 12 but defines an oblique angle $\alpha$ with respect to the vertical axis Z.

FIG. 2 is a schematic diagram depicting portions of system 2 including a plan or top view of the transparent substrate 4 with an upper surface 37. At the upper end 18, an input slot shaped opening or nozzle 38 introduces the sheet of resin 22 that flows across build plane 36. At the lower end 20, a receiving slot or opening 40 receives and drains the resin 22.

Also illustrated is a vibration unit 42 coupled to the transparent substrate 4 and under control of controller 14. The vibration unit imparts an oscillation to the glass plate 4 to help prevent accumulation of cured resin 22 upon the upper surface 37 and/or help to separate the lower face 34 from the upper surface 37. The vibration unit 42 can be one or more of an ultrasonic oscillation unit, a motorized eccentric weight, or other means of generating vibrations.

FIG. 3 is a schematic side view of the transparent substrate 4 having upper surface 37. The transparent substrate can be formed from a variety of different materials. Generally speaking, the transparent substrate 4 can be a rigid transparent plate 4 or a flexible, pliable, and/or compressible transparent substrate 4. In some embodiments, the transparent substrate 4 can have non-parallel opposing sides. The transparent substrate can be formed using a number of different processes including extrusion, injection molding, blow molding, compression molding, float method (glass sheets), multilayer processes such as thin film depositions, and conventional processes.

In one embodiment, the transparent substrate 4 is formed from a glass. In some implementations, the upper surface 37 can have a modified surface topology. In one implementation, the modification can include a roughening process such as bead blasting or etching. In another implementation, channels can be formed into the upper surface 38.

In another embodiment, the transparent substrate 4 is formed from a porous glass or other material. The porosity will facilitate oxygenation of the resin 22 along the upper surface 37 which would help to prevent resin from being cured onto the upper surface 37.

In yet another embodiment the transparent substrate 4 can be formed from an injection molded polymer. The polymer can be an optical grade polyolefin. The injection molding process can be used to define features such as channels in the upper surface 37.

In a further embodiment, the transparent substrate 4 is formed from a micro-embossed polymer. Channels or other features can be formed in the upper surface 37 through the micro-embossing process.

In yet further embodiments, the transparent substrate 4 can be formed from other materials such as sapphire or quartz. In still other embodiments, the transparent substrate 4 can be formed from a multilayer laminated and/or deposited structure.

Figure 4:
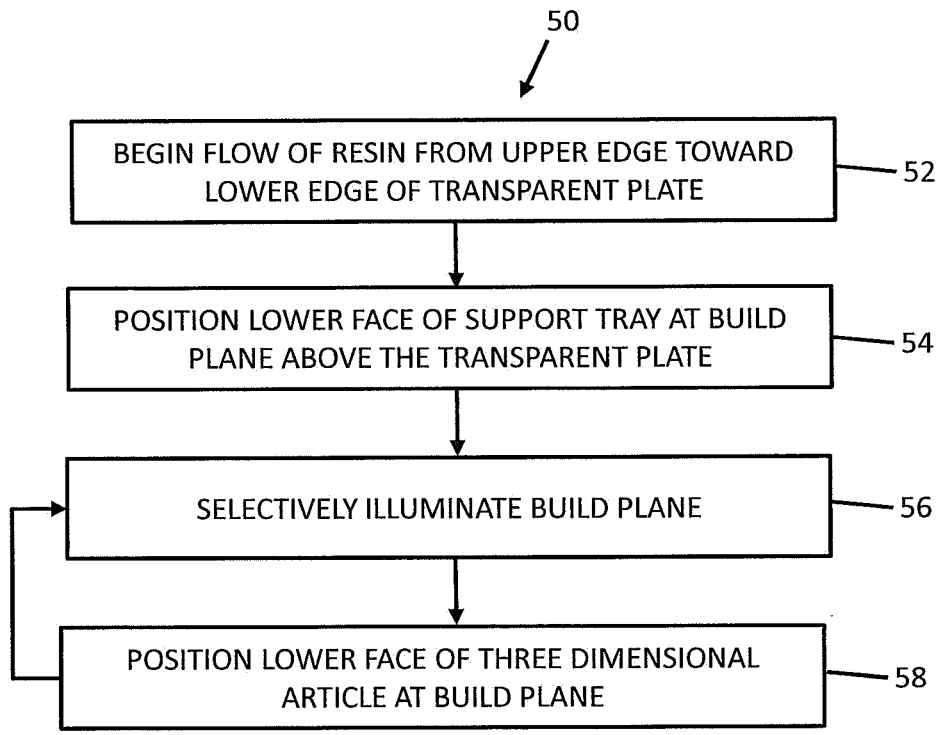
FIG. 4 is a flowchart depicting an embodiment of a method for manufacturing a three-dimensional article.

FIG. 4 is a flowchart depicting a method 50 for manufacturing a three-dimensional article 32 utilizing the three-dimensional printing system 2. Method 50 is accomplished by the controller 14 acting upon portions of system 2. According to 52, a gravity-driven flow of resin 22 is established from the upper end 18 to the lower edge of 20 of the transparent substrate 4 over the upper surface 37.

According to 54, the lower face 30 of the support tray 8 is positioned at the build plane 36. According to 56, the light engine 12 is operated to selectively illuminate the build plane 36 and thereby selectively harden resin onto the lower face 30 to thereby define the lower face 34 of the now-forming three-dimensional article 32. According to 58, the movement mechanism 10 is operated to position the lower face 34 at the build plane 36. The process loops back to 56 at which the light engine 12 is again operated to selectively illuminate build plane 36 to thereby selectively harden resin onto the lower face 34. The positioning 58 and selective illumination 58 is repeated to complete fabrication of the three-dimensional article 32 in a layer-by-layer manner.

The specific embodiments and applications thereof described above are for illustrative purposes only and do not preclude modifications and variations encompassed by the scope of the following claims.

What is claimed:

1. A three-dimensional printing system for manufacturing a three-dimensional article comprising:
   a transparent substrate that slopes downwardly from an upper end toward a lower end;
   a fluid handling system for inputting photocurable resin at the upper end and receiving the resin at the lower end to thereby provide a flowing sheet of resin over an upper surface of the transparent substrate;
   a support tray mounted to a movement mechanism and having a lower face for supporting the three-dimensional article, the lower face is generally parallel to the upper surface of the transparent substrate; and
   a light engine positioned below the transparent substrate for selectively illuminating the resin along a build plane that is within the resin and generally parallel to the upper surface of the transparent substrate; the upper surface of the transparent substrate has a topology formed by one or more of mechanical roughening, etching, micro-embossing, and injection molding.

2. The three-dimensional printing system of claim 1 wherein the slope of the transparent substrate defines an angle with respect to a horizontal plane between 5 and 40 degrees.

3. The three-dimensional printing system of claim 1 wherein the transparent substrate is a rigid transparent plate.

4. The three-dimensional printing system of claim 3 wherein the rigid transparent plate is formed from one or more of glass, quartz, porous glass, sapphire, and a polymer.

5. The three-dimensional printing system of claim 1 wherein the transparent substrate is formed from a flexible material.

6. The three-dimensional printing system of claim 1 wherein the transparent substrate is formed from one or more of micro embossed polymer, injection molded polymer, a multilayer laminate, and a multilayer vacuum deposited structure.

7. The three-dimensional printing system of claim 1 further comprising a vibration unit coupled to the transparent substrate that imparts vibrational motion in the plane of the upper surface.

8. The three-dimensional printing system of claim 1 wherein the light engine is a projection unit.

9. The three-dimensional printing system of claim 8 wherein the light engine includes a light source and a spatial light modulator.

10. The three-dimensional printing system of claim 8 wherein the projection unit defines an optical axis that defines an oblique angle with a vertical axis.

11. The three-dimensional printing system of claim 10 wherein the oblique angle is between 5 and 40 degrees.

12. The three-dimensional printing system of claim 1 further comprising a controller coupled to the fluid handling system, the movement mechanism, and the light engine, the controller is configured to:
   operate the fluid handling system to provide the flow of the resin over the upper surface of the transparent substrate;
   operate the movement mechanism to position the lower face of the support tray or three-dimensional article at the build plane;
   operate the light engine to selectively harden a layer of resin upon the lower face; and
   repeat operation of the movement mechanism and the light engine to complete formation of the three-dimensional article in a layer-by-layer manner.

13. A method of manufacturing the three-dimensional article using the three-dimensional printing system of claim 1 comprising the steps of:
   operate the fluid handling system to provide the flow of the resin over the upper surface of the transparent substrate;
   operate the movement mechanism to position the lower face of the support tray or three-dimensional article at the build plane;
   operate the light engine to selectively harden a layer of resin upon the lower face; and
   repeat operation of the movement mechanism and the light engine to complete formation of the three-dimensional article in a layer-by-layer manner.

14. The method of claim 13 further comprising imparting a vibration along the top surface of the transparent substrate while the resin is flowing.

15. The method of claim 13 wherein the light engine includes an array of light emitters that define an array of light spots at the build plane, the method includes scanning the light spots along the build plane.

* * * * *